United States Patent
Wang (10) Patent No.: US 8,912,925 B2
(45) Date of Patent: Dec. 16, 2014

(54) AIRCRAFT AND METHOD FOR DISPLAYING A VISUAL INFORMATION ASSOCIATED TO FLIGHT PARAMETERS TO AN OPERATOR OF AN AIRCRAFT

(71) Applicant: Agustawestland S.p.A., Samarate (IT)

(72) Inventor: James Wang, Samarate (IT)

(73) Assignee: Agustawestland S.p.A., Samarate (IT)

(*) Notice: Subject to any disclaimer, the term of this patent is extended or adjusted under 35 U.S.C. 154(b) by 43 days.

(21) Appl. No.: 13/873,784

(22) Filed: Apr. 30, 2013

(65) Prior Publication Data

US 2013/0307705 A1 Nov. 21, 2013

(30) Foreign Application Priority Data

May 11, 2012 (EP) .................................... 12425089

(51) Int. Cl.
| | |
|---|---|
| *G01C 21/00* | (2006.01) |
| *B64D 45/00* | (2006.01) |
| *G02B 27/01* | (2006.01) |
| *G02B 27/22* | (2006.01) |
| *G02B 27/64* | (2006.01) |

(52) U.S. Cl.
CPC ............... *B64D 45/00* (2013.01); *G02B 27/01* (2013.01); *G02B 27/2292* (2013.01); *G02B 27/64* (2013.01); *G02B 27/0101* (2013.01); *G02B 2027/0141* (2013.01)
USPC ............ 340/980; 340/945; 340/971; 340/974

(58) Field of Classification Search
CPC .... B64D 45/00; G02B 27/64; G02B 27/2292; G02B 27/01; G02B 27/0101; G02B 2027/0141
USPC ......... 340/980, 975, 974, 973, 967, 945, 971; 701/3
See application file for complete search history.

(56) References Cited

U.S. PATENT DOCUMENTS

| | | | |
|---|---|---|---|
| 2,887,927 A | 5/1959 | Newton | |
| 3,899,241 A | 8/1975 | Malobicky, Jr. et al. | |
| 5,278,696 A | 1/1994 | Suvada | |
| 5,675,328 A * | 10/1997 | Coirier et al. | 340/975 |
| 5,748,346 A | 5/1998 | David et al. | |
| 6,567,014 B1 * | 5/2003 | Hansen et al. | 340/980 |
| 6,577,355 B1 | 6/2003 | Yaniv | |
| 6,686,850 B2 * | 2/2004 | Hausmann | 340/967 |
| 7,696,955 B1 | 4/2010 | Krenz et al. | |
| 2006/0066459 A1 | 3/2006 | Burch et al. | |
| 2006/0087542 A1 | 4/2006 | McGrane | |
| 2009/0265060 A1 | 10/2009 | Shibasaki | |

FOREIGN PATENT DOCUMENTS

| | | |
|---|---|---|
| EP | A-1906151 | 4/2008 |
| WO | WO 95/13557 | 5/1995 |
| WO | WO 2005/015333 | 2/2005 |
| WO | WO 2012/038170 | 3/2012 |

* cited by examiner

*Primary Examiner* — Anh V La
(74) *Attorney, Agent, or Firm* — Leason Ellis LLP (57) ABSTRACT

There is described an aircraft, comprising a windscreen arranged in a front side of aircraft, characterized in that an edge of windscreen defines a visualization area visible by an operator, and by comprising displaying means configured for displaying at least one visual information of at least one flight parameter within visualization area, at least when aircraft is in a normal flight configuration.

15 Claims, 9 Drawing Sheets

AIRCRAFT AND METHOD FOR DISPLAYING A VISUAL INFORMATION ASSOCIATED TO FLIGHT PARAMETERS TO AN OPERATOR OF AN AIRCRAFT

The present invention relates to an aircraft.

The present invention also relates to a method for displaying a visual information associated to at least one flight parameter to an operator of an aircraft.

BACKGROUND OF THE INVENTION

As it is generally known, aircrafts, in particular helicopters or convertiplanes, may need to operate in a condition of limited in-flight visibility.

This limited visibility may be due, for example, to dust or sand in the air, when the aircraft operates in a desert area.

In this case, the resulting limited visibility condition is generally known as "brownout".

A further kind of limited visibility condition is the so-called "whiteout" condition, in which visibility and contrast are severely reduced.

Whiteout may be due to heavy snowfall rates or to diffuse lighting from overcast cloud, mist or fog, or a background of snow.

Both the conditions are likely to cause accidents, especially during landing or take-off operations.

These accidents are mainly due to the fact that the pilot cannot see surrounding objects, which usually provide the outside visual references necessary to control the aircraft near the ground. As a result, the pilot can be spatially disoriented and lose the awareness and the promptness necessary to properly control the aircraft.

Furthermore, the pilot is likely to lose any visual perception of the horizon and/or to fall into physical and mental instability.

The above situation is likely to generate a risk of side slipping of the aircraft.

In the case of helicopters or convertiplanes, intense dust clouds stirred up by the rotor downwash during near-ground flight may cause significant flight safety risks, thus dramatically increasing the risk of accidents.

A need is felt within the sector to reduce as far as possible the risks of accidents when the aircraft is operated in conditions of in-flight limited visibility, especially in "brownout" or "whiteout" conditions.

A need is also felt, during other delicate maneuver, e.g. mountain rescue operations, to provide the pilot with key flight data without requiring him to look down the instrument console.

WO2005/015333 discloses a flight control system for aircrafts capable of vertical take off and landing.

In greater detail, the flight control system is adapted to facilitate flying in conditions of restricted visibility and substantially comprises: a series of sensors for receiving environmental information, and a central processing unit that combines the environmental information received from the with mission-specific information.

The central processing unit filters the environmental information and converts it into a visual format which may be implemented either in a head-mounted display or in a head up display.

US-A-2009/0265060 discloses a method for operating a brownout/obscured landing system. The method comprises the steps of receiving data indicating aircraft position, displaying a three-dimensional perspective grid on a map and electronically moving the grid on the display in response to the aircraft position.

In particular, the map is displayed on a pilot kneeboard.

US-A-2006087542 discloses a method and a system for supporting pilots in landing helicopter in visual flight under brownout or whiteout conditions. In detail, three-dimensional data of the planned landing site are generated during the approach for landing, and are accumulated in a three-dimensional representation of the landing site. A virtual external view is continuously generated from this three-dimensional representation and displayed to the pilot.

EP-A-1906151 discloses an imaging and display system which provides helicopter pilots with an unobstructed display of a landing area in whiteout or brownout conditions, by capturing a high resolution image of the landing area prior to obscuration.

SUMMARY OF THE INVENTION

It is an object of the present invention to provide an aircraft, designed to meet at least one of the above requirement in a straightforward, low-cost manner.

This object is achieved by an aircraft, as claimed in claim 1.

The present invention also relates to a method for displaying a visual information of at least one flight parameter to an operator of an aircraft, as claimed in claim 12.

BRIEF DESCRIPTION OF THE DRAWINGS

Four non-limiting embodiment of the present invention will be described by way of example with reference to the accompanying drawings, in which.

DETAILED DESCRIPTION OF THE INVENTION

Figure 1:
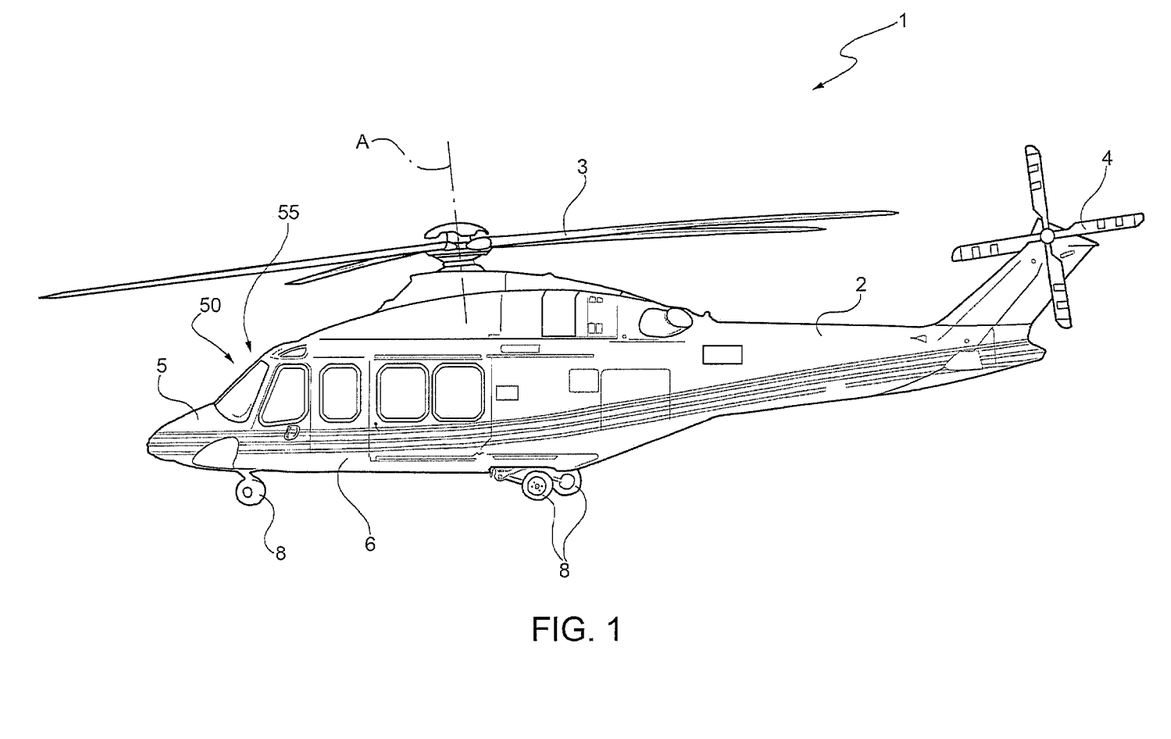
FIG. 1 shows a lateral view of a first embodiment of an aircraft according to the present invention and in a normal flight position.

Number 1 in FIG. 1 indicates an aircraft, a helicopter in the embodiment shown, substantially comprising a fuselage 2 with a nose 5; a main rotor 3 fitted to the top of fuselage 2 and rotating about an axis A; and a tail rotor 4 fitted to a tail fin projecting from fuselage 2 at the opposite end to nose 5, and rotating about axis crosswise to axis A.

Helicopter 1 also comprises a plurality of undercarriages 8 downwardly protruding from fuselage 2 and arranged, on the opposite side of fuselage 2, relative to rotor 3.

Fuselage 2 also defines a cockpit 6 housing an instrument console 7 and a windscreen 50 arranged on the front side of aircraft 1, i.e. on the side of nose 5.

Windscreen 50 is bounded by an edge 55.

Console 7 comprises (FIG. 6) at least:
- an artificial horizon 40 for informing the pilot of the orientation of helicopter 1 relative to the earth, in particular for indicating the pitching and the rolling of aircraft 1;
- an altimeter 41 for indicating the altitude of aircraft 1;
- an air speed indicator 42 for indicating the speed of aircraft 1; and
- a heading indicator 43 for indicating the direction of helicopter 1.

Advantageously, edge 55 of windscreen 50 bounds a visualization area 59 visible by an operator and helicopter 1 comprises displaying means 58 configured for displaying a visual information associated to a plurality of flight parameters within the edge of visualization area 59, at least when helicopter 1 is in a normal flight configuration;

displaying means 58 are configured for displaying at least part of the visual information:
- inside cockpit 6; and/or
- outside cockpit 6; and/or
- on windscreen 50.

In other words, even if the visual information is displayed inside cockpit 6 and/or outside cockpit and/or on windscreen 50, the operator sees the visual information within edge 55 of windscreen 50.

In other words, in the visual plane of the operator, the visual information appears to be contained within edge 55 of windscreen 50.

Visual information comprises an image 20 and an image 25.

Displaying means 58 comprise, in the embodiment shown in FIG. 1, a projector group 10 configured to project the visual information associated to a plurality of flight parameter onto reflecting surfaces 30, 31 visible by an operator and arranged above console 7, with reference to the normal flight configuration of helicopter 1.

With the expression "normal flight configuration", it is indicated in the present description an operative configuration, in which rotor 3 is arranged above undercarriages 8 and a longitudinal axis of helicopter 1 is substantially horizontal.

In detail, projector group 10 comprises (FIGS. 2 and 6):
- a laser projector 11 projecting image 25 which is reflected onto surface 31; and
- a micro-projector 12 projecting image 20 (FIG. 3), which is reflected onto surface 30.

Projector group 10 is normally switched off. Accordingly, images 20, 25 are not detected by enemy aircrafts and the presence and/or the position of helicopter 1 is not revealed to the enemy aircrafts.

Projector group 10 is switched on when:
- helicopter 1 needs to operate with in-flight limited visibility, for example due to the presence of brown-out or white-out conditions; and/or
- helicopter 1 is carrying out a delicate maneuvering operation and it is, therefore, necessary to inform the pilot of flight parameters, without requiring him to look down onto instrument console 7.

Figure 4:
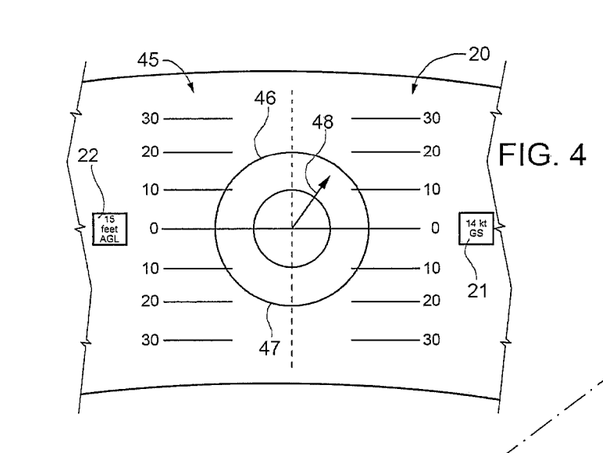
FIG. 4 shows a second image projected onto a screen of the aircraft of FIG. 1.

In detail, image 20 shows a numeric value 22 of the altitude of helicopter 1 and a numeric value 21 of the magnitude of speed of helicopter 1 relative to the ground (FIG. 4).

Image 20 also shows:
- a graduate scale 45 comprising a plurality of parallel horizontal lines;
- a plurality, two, in the embodiment shown, of concentric circles 46 having a centre 47 in one of lines of scale 45; and
- an arrow 48 starting from centre 47 and adapted to visually display the angle between the direction of speed vector of helicopter 1 and a reference direction.

Image 25 comprises (FIG. 3) a line 26 showing an additional "artificial" horizon and a line 27 orthogonal to first line 26.

Figure 3:
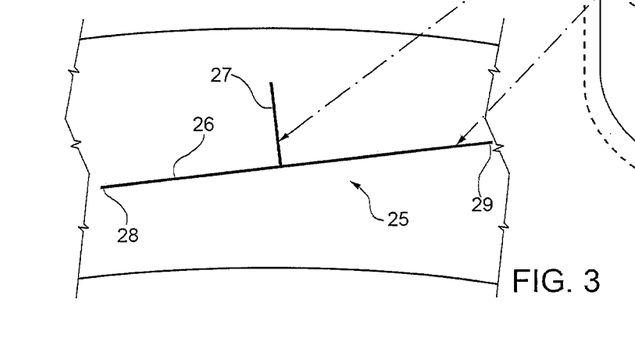
FIG. 3 shows a first image projected by the components shown in FIG. 1.

In other words, line 26 is parallel to the line of the horizon. Line 26 is colored.

Laser projector 11 substantially comprises (FIGS. 2 and 5):
- a frame 17 fitted to helicopter 1;
- a laser generator 13 adapted to generate a laser radiation intended to form image 25 onto screen 33; and
- a support structure 16 (FIG. 5) interposed between fuselage 2 and laser generator 13, and adapted to maintain laser generator 13 in a fixed position relative to earth regardless of the movement of helicopter 1 and, therefore, of frame 17 in a plane.

Figure 2:
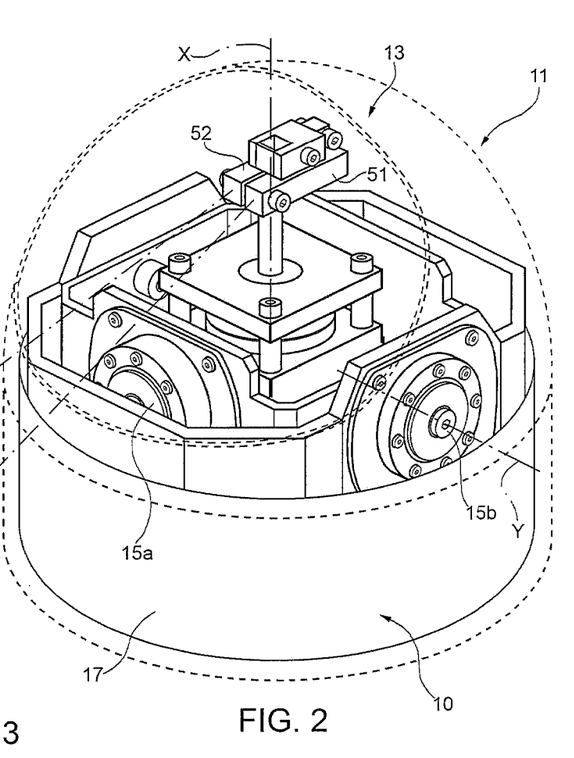
FIG. 2 is an enlarged view of first components of the aircraft of FIG. 1.

In the embodiment of FIG. 2, laser generator 13 comprises a first source 51 for emitting a laser radiation intended to form line 26 of image 25 and a second source 52 for emitting a laser radiation intended to form line 27 of image 25.

Figure 5:
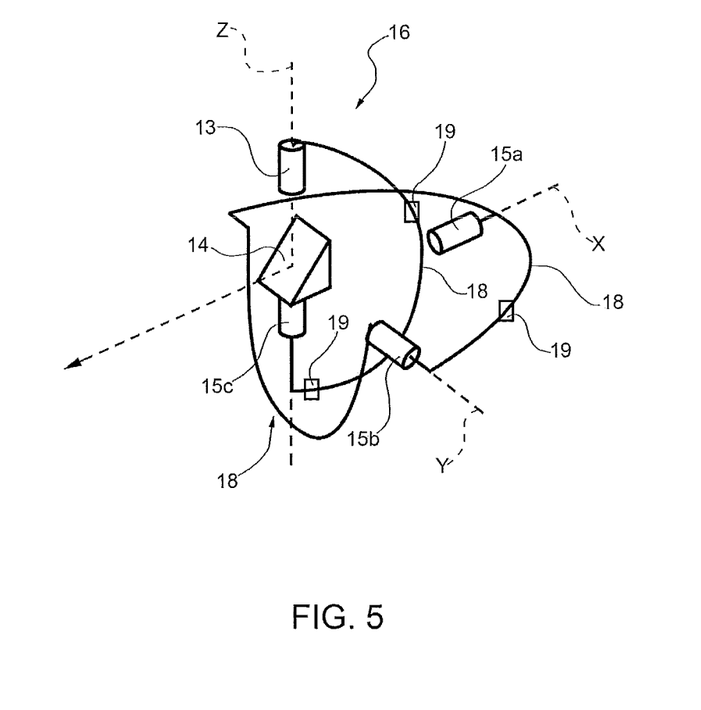
FIG. 5 schematically shows second components of the aircraft of FIG. 1.

In detail, support structure 16 comprises, in the embodiment shown, three gimbals 18 connected to each other and which maintain laser generator 13 in fixed position, when frame 17 moves along two directions X, Y orthogonal to each other and rotates about an axis Z orthogonal to plane defined by directions X, Y.

Furthermore, support structure 16 comprises:
- a plurality of sensors 19 (only schematically shown in FIG. 5) adapted to sense the position of helicopter 1 relative to the earth along directions X, Y and about axis Z; and
- a plurality of motors 15a, 15b, 15c controlled by sensors 19 and adapted to exert respective forces onto support structure 16.

More precisely, two linear motors 15a, 15b move laser generator 13 along two orthogonal directions X, Y which defines a horizontal plane, and rotary motor 15c rotates laser generator 13 about an axis Z orthogonal to this plane.

In this way, for each and every position of helicopter 1 in the horizontal plane, laser generator 13 remains in a fixed position relative to this horizontal plane.

Accordingly, lines 26 and 27 are not affected by the position of helicopter relative to earth in the plane defined by directions X, Y.

In other words, laser generator 13 is gyro-stabilized.

As shown in FIG. 5, laser projector 11 may comprise a mirror 14 adapted to deviate laser radiation generated by laser generator 13 towards surface 31.

Preferably, laser generator 13 is a laser beam generator and laser projector 11 comprises a diffracting element (not-shown) which receives the laser beam and outputs lines 25, 26 towards surfaces 30, 31.

Alternatively, laser generator 13 comprises a plurality of laser beam sources arranged along two mutually orthogonally lines and adapted to directly project lines 25, 26 towards surfaces 30, 31.

Line 26 is wide enough to be easily recognized by pilot, for a wide range of the position of his head within cockpit 6.

Preferably, the angle between opposite edge 28, 29 of line 26 and laser generator 13 equals or is greater than 60 degrees.

Figure 6:
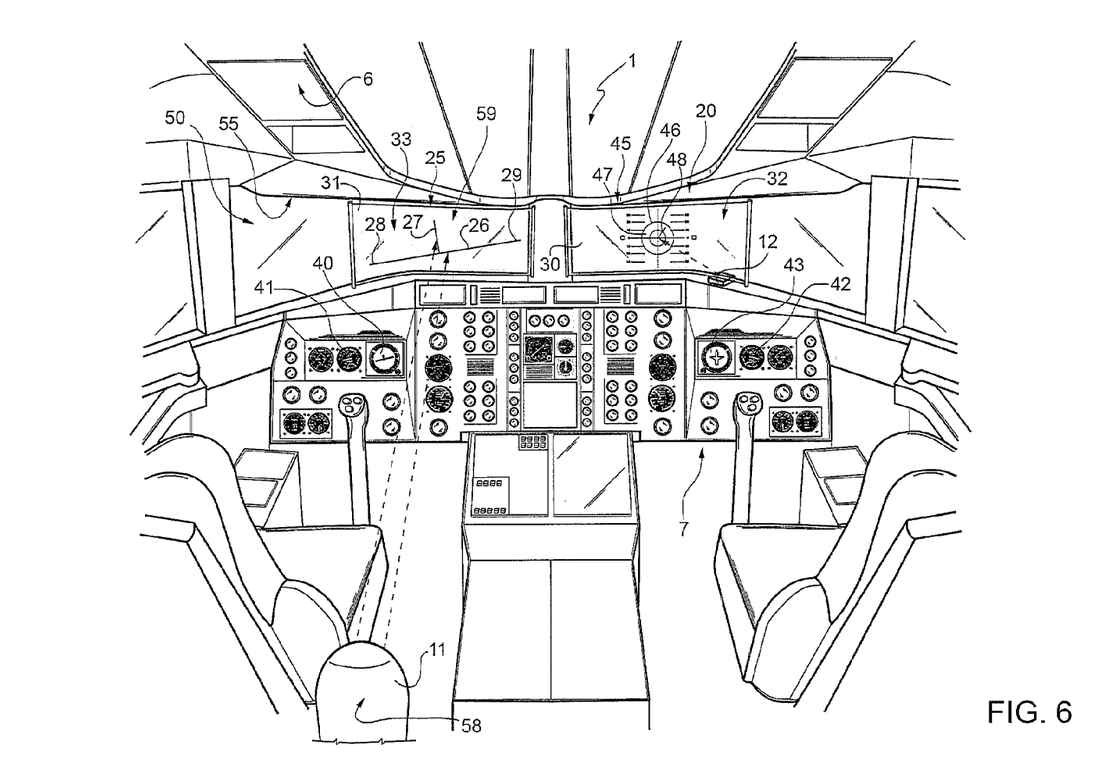
FIG. 6 shows third components of the aircraft of FIG. 1.

Helicopter 1 further comprises:
- a screen 32 defining surface 30; and
- a screen 33 defining surface 31.

Screens 32, 33 are housed within cockpit 6 and are foldable.

In particular, screen 32 is movable between:
a stored position; and
a work position in which surface 30 is in front of micro-projector 12 and reflects image 20 above instrument console 7 and towards the pilot.

In the very same way, screen 33 is movable between:
a stored position; and
a work position in which surface 31 is in front of laser generator 13 and reflects image 25 above instrument console 7 and towards the pilot.

Preferably, screen 32 is a film type screen.

In particular, screen 32 is a liquid crystal display.

In the embodiment shown, screen 32 becomes transparent or opaque, depending on whether or not electric voltage is applied to liquid crystals of screen 32.

More precisely, when projector group 10 is switched off, no electrical voltage is applied to liquid crystals of screen 32, which is, therefore, transparent.

Conversely, when laser projector 11 is switched on, an electrical voltage is applied to screen 32, which becomes, therefore, opaque.

Alternatively, screen 32 is a transparent with a grid embedded therein which reflects image 20 projected by projector 10.

In a further alternative, displaying means 58 comprises a central processing unit operatively connected with sensor 19, and screen 32 is a transparent graphic screen of the type used for example, in the laptops.

In this further alternative, the central processing unit generates image 20 on screen 32 and projector group 10 is not present.

In the embodiment shown, screen 33 is a polarized scattering film.

Preferably, screen 33 is curved and, in particular, concave.

In the embodiment shown, the visual information, i.e. images 20, 25, is displayed on screens 32, 33 and is, therefore, displayed inside cockpit 6 and between the position of the crew and the windscreen 50.

Figure 10:
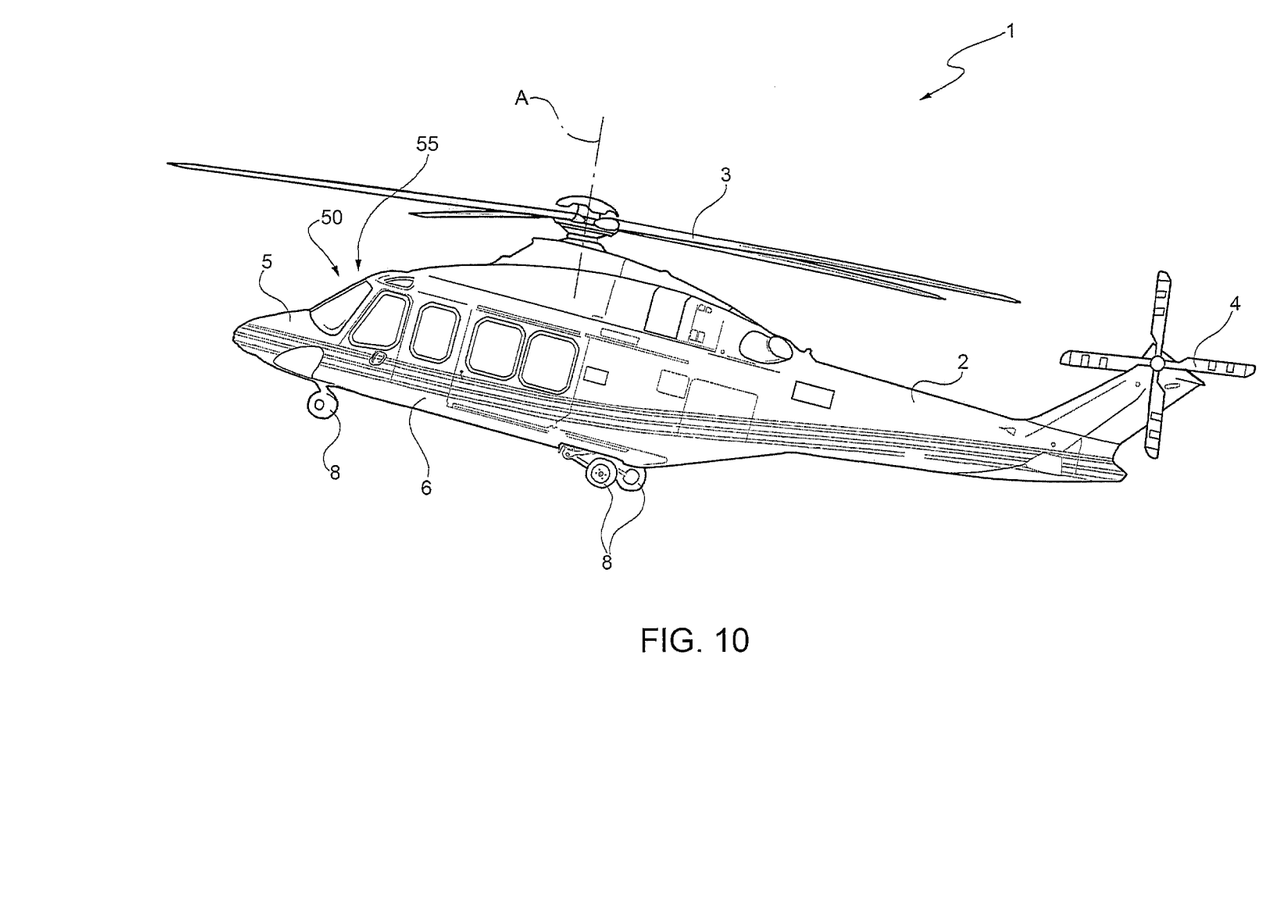
FIG. 10 shows the first embodiment of the aircraft of FIGS. 1 to 6 and in a different flight position.
Figure 11:
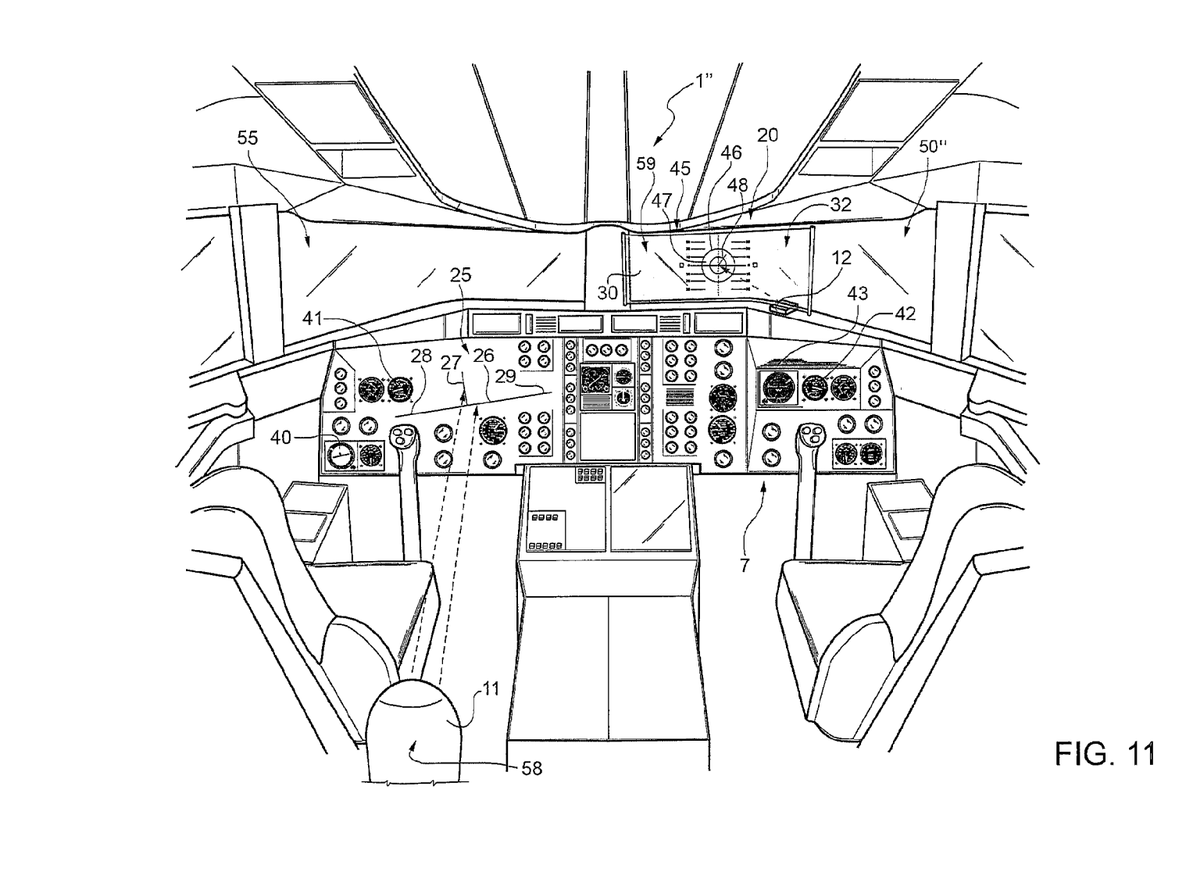
FIG. 11 shows the third components of FIG. 6, when the aircraft is in the different flight position of FIG. 10.

As shown in FIG. 11, when helicopter 1 is highly sloped relative to a horizontal plane with nose 5 at a higher height than rotor 4 (FIG. 10), line 26 is projected on console 7, thus remaining visible to the pilot.

In other words, displaying means 58 display an additional artificial horizon on console 7.

In operation, in case of in-flight limited visibility conditions, e.g. due to the "brown-out" or "white-out" conditions, projector group 10 is switched on.

Furthermore, projector group 10 can be switched on during delicate maneuvers, e.g. mountain rescue operations.

Regardless of the position of helicopter 1 relative to earth in the plane defined by directions X, Y, support structure 16 maintains laser generator 13 in a fixed position relative to the earth.

Furthermore, sensors 19 sense the relative position and inclination of laser generator 13 relative to the earth and control motors 15a, 15b, 15c in such a way that motors 15a, 15b, 15c exert onto support structure 16 respective stabilizing forces along directions X, Y and about axis Z. The forces exerted by motors 15a, 15b, 15c are effective in stabilizing laser generator 13 and, therefore, image 25 in a constant position relative to earth.

Furthermore, when projector group 10 is switched on, an electric voltage is applied to liquid crystals forming screen 33, thus rendering screen opaque and enhancing its reflectivity.

At this stage, laser projector 11 projects image 25 onto screen 33 and micro-projector 12 projects image 20 onto screen 32.

More precisely, line 26 of image 25 provides the pilot with an indication of the horizon, without requiring him to look at instrument console 7.

In the very same way, image 25 provides the pilot with an indication of the altitude of helicopter 1, of the magnitude of the speed of helicopter 1 relative to the ground, and of the direction of helicopter 1 relative to a fixed reference, without requiring the pilot to look at instrument console 7.

When aircraft 1 is in the sloped configuration shown in FIG. 10 and operates with limited visibility, the pilot can see line 26 (FIG. 11). In other words, the pilot can see an additional horizontal artificial in front of him and in magnified view.

Figure 7:
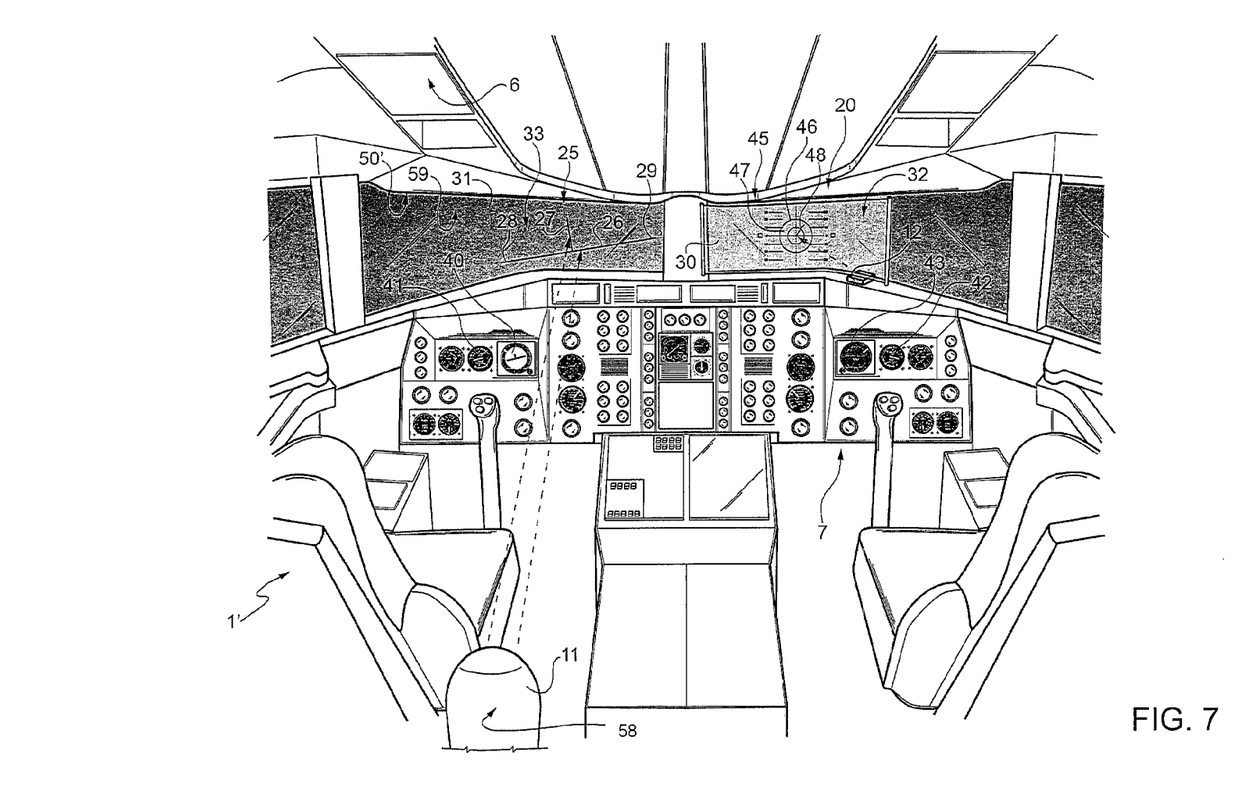
FIG. 7 shows third components of a second embodiment of the aircraft of FIG. 1.

Number 1' in FIG. 7 indicates as a whole a different embodiment of an aircraft, in particular a helicopter, in accordance with the present invention.

Helicopter 1' is similar to helicopter 1, and is only described below as regards the differences between the two; any corresponding or equivalent parts of helicopter, 1, 1' being indicated, where possible, using the same reference numbers.

More specifically, helicopter 1' differs from helicopter 1 for not comprising screen 33, and for comprising a windscreen 50' defined by cockpit 6 and which defines surface 31'.

Preferably, windscreen 50' is covered by a polarizing reflecting coating in order to increase its reflectivity.

In particular, the reflecting coating comprises acryl.

In the embodiment shown in FIG. 7, the visual information, i.e. images 20, 25, are displayed in part on windscreen 50' and in part on screen 32. The visual information is, therefore, displayed partly inside cockpit 6 and between the position of the crew and the windscreen 50, and partly on windscreen 50'.

The operation of helicopter 1' differs from the one of helicopter 1 only in that image 25 is shown on windscreen 50', instead of screen 33.

Figure 8:
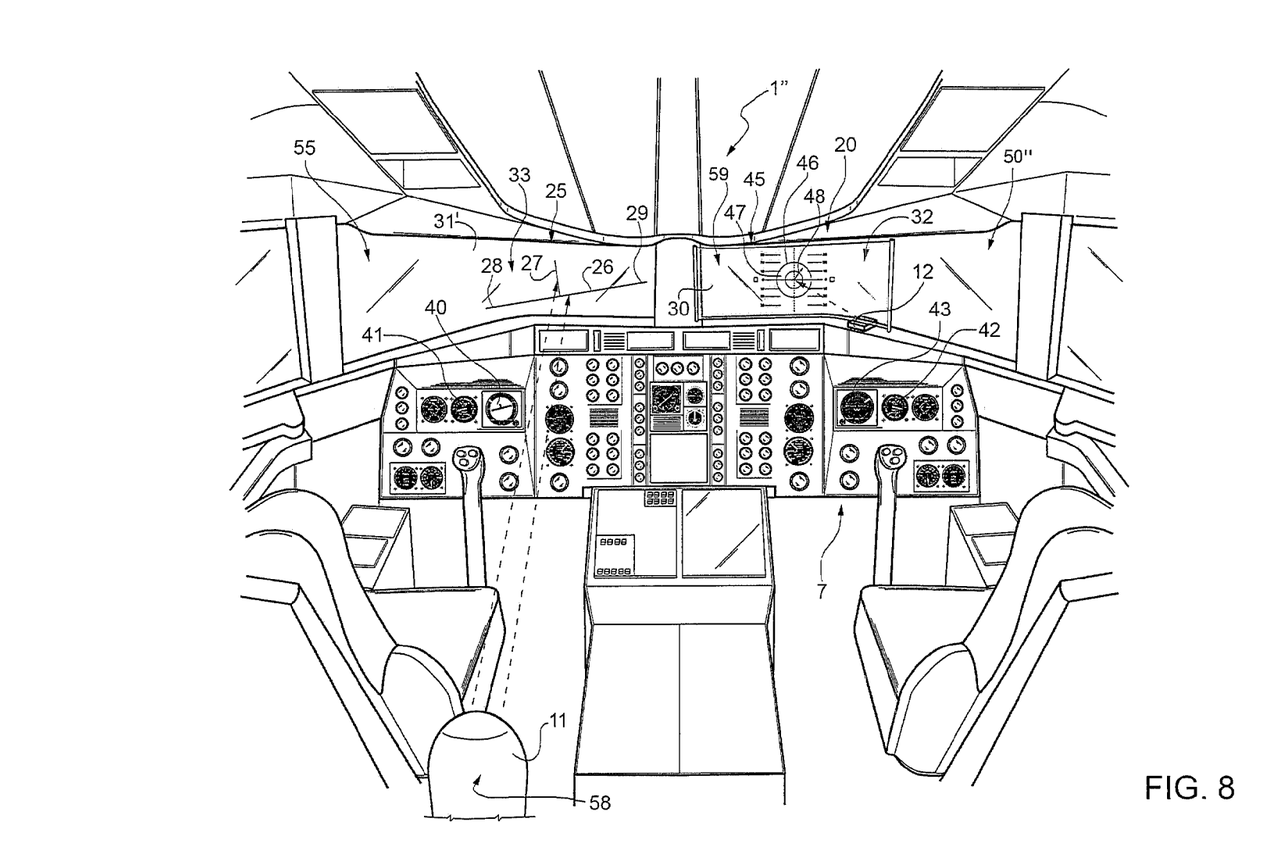
FIG. 8 shows third components of a third embodiment of the aircraft of FIG. 1.

Number 1" in FIG. 8 indicates as a whole a different embodiment of an aircraft, in particular a helicopter, in accordance with the present invention.

Helicopter 1" is similar to helicopter 1, and is described only as regards the differences between the two; any corresponding or equivalent parts of helicopter 1, 1" being indicated, where possible, using the same reference numbers.

More specifically, helicopter 1" differs from helicopter 1 for not comprising screen 33 and in that surface 31" is defined by grains of sand in case of brownout conditions or by snow crystals in case of whiteout conditions.

Furthermore, laser projector 11 comprises detecting means for measuring the reflectivity of grains of sands or snow crystals, and automatically adjusting the intensity of laser radiation generated by laser generator 13.

In the embodiment shown in FIG. 8, the visual information, i.e. images 20, 25, is displayed in part on screen 32 and in part on grains of sand or snow crystals.

Accordingly, images 20, 25 are displayed partly inside cockpit 6 and between the position of the crew and the windscreen 50, and partly outside cockpit 6 and on the opposite side of windscreen 50" relative to the crew position.

The operation of helicopter 1" differs from the one of helicopter 1 only in that image 25 is shown on grains of sands or snow crystals, instead of screen 33.

Figure 9:
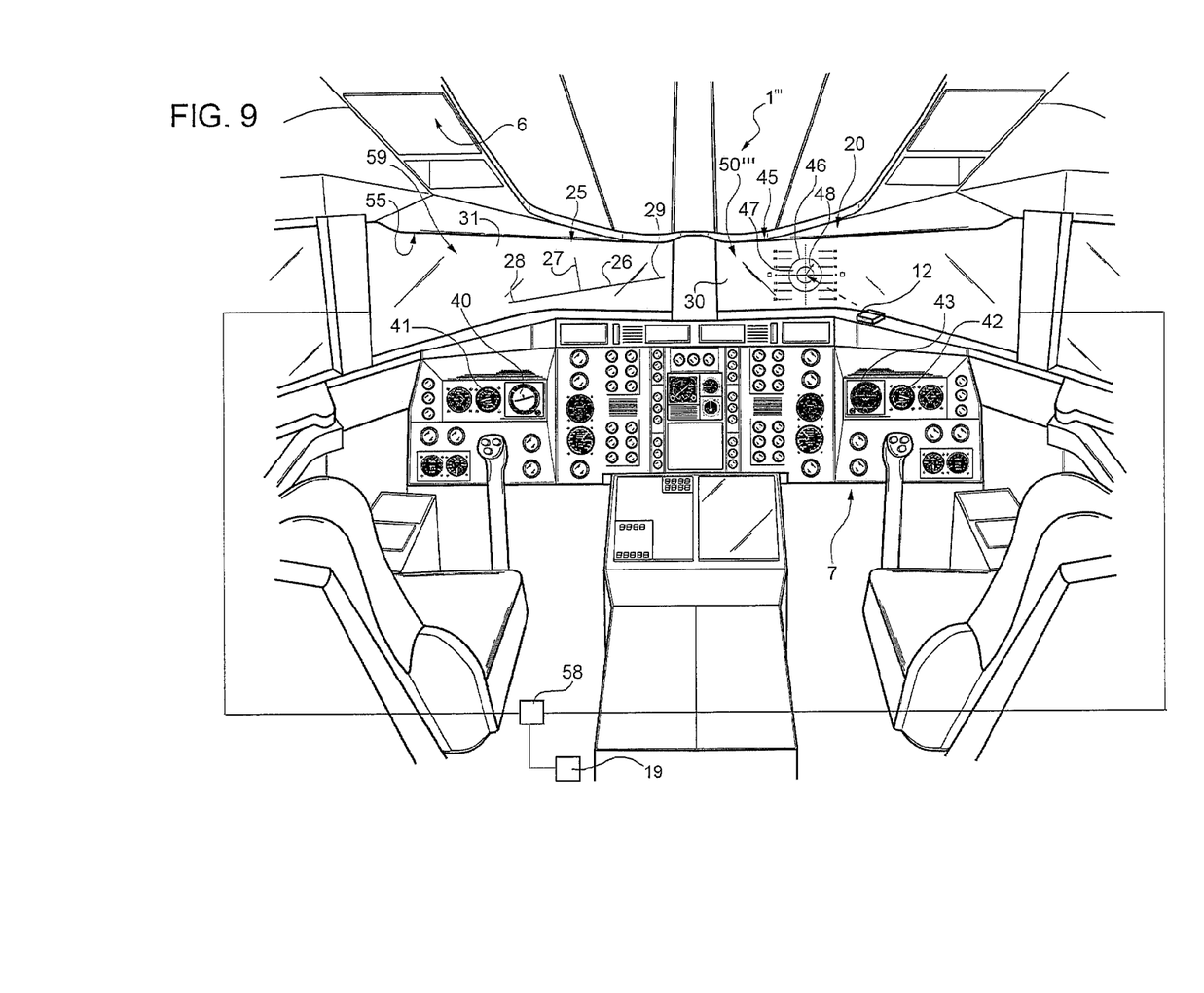
FIG. 9 shows fourth components of a fourth embodiment of the aircraft of FIG. 1.

Number 1''' in FIG. 9 indicates as a whole a different embodiment of an aircraft, in particular a helicopter, in accordance with the present invention.

Helicopter 1''' is similar to helicopter 1, and is only described below as regards the differences between the two; any corresponding or equivalent parts of helicopter, 1, 1''' being indicated, where possible, using the same reference numbers.

More specifically, helicopter 1''' differs from helicopter 1''' for comprising neither screens 32, 33 nor laser projector 10.

Furthermore, helicopter 1''' differs from helicopter 1 in that a transparent graphic screen is embedded within windscreen 50'''. Displaying means 58 comprises a central processing unit operatively connected with sensor 19 and which displays images 20, 25 onto windscreen 50'''.

In a not-shown alternative, helicopter 1''' does not comprise screen 32 and 33 and comprises laser projector 10.

In this not-shown alternative, a transparent screen is embedded within windscreen 50''' and reflects images 20, 25 projected by laser projector 10.

In this case, a reflective grid is embedded within the transparent screen, so as to reflect images 20, 25.

In the embodiment shown in FIG. 9, the visual information, i.e. images 20, 25, is completely displayed on windscreen 50'''.

The operation of helicopter 1''' differs from the one of helicopter 1 only in that images 20, 25 are shown on windscreen 50''', instead of on screens 32, 33.

The advantages of helicopter 1, 1', 1'', 1''' and of the method according to the present invention will be clear from the above description.

In particular, projector group 10 projects the visual information formed by images 20, 25 onto surfaces 30, 31 visible by the pilot and arranged above the instrument console 7.

Accordingly, the pilot can easily see this visual information, without looking down to console 7.

In other words, displaying means 50 act as a sort of "head-up" display which allows the pilot to see the visual information while looks up and towards windscreen 50, 50', 50'', 50'''.

The pilot's control feeling is therefore greatly enhanced in case of in-flight limited visibility conditions, especially in case of "brown-out" or "white-out" conditions and/or during delicate manoeuvres, like rescue missions.

As a consequence, the risk of accident in the above conditions is dramatically reduced.

It is important to mention that the risk of accident is reduce by using very simple and cheap components like laser generator 13 and reflecting surfaces 30, 31, and without requiring the generation of an image of the ground like in the prior art discussed in the introductory part of the present description.

Surface 30 reflects image 25 which comprises line 26 showing the horizon.

In this way, the pilot of helicopter 1, 1', 1'', 1''' is provided with an additional "artificial horizon", which may be easily seen without looking to console 7.

Accordingly, the pilot is likely to maintain a visual perception of the horizon.

It is important to mention that when helicopter 1, 1', 1'', 1''' is highly sloped relative to a horizontal plane with nose 5 at a higher height than rotor 4, line 26 is projected on console 7, thus remaining visible to the pilot (see FIGS. 10 and 11).

In other words, the pilot can see an additional horizontal artificial in front of him and in magnified view. It is therefore strongly avoided the risk that the pilot loses the visual perception of the horizon.

This dramatically reduces the risk of side-slipping of helicopter 1, 1, 1'', 1''' and of the consequent accidents.

Furthermore, surface 31 reflects image 20 which comprises numeric value 22 of the altitude of helicopter 1, numeric value 21 of the magnitude of speed of helicopter 1 relative to the ground, and arrow 48 showing of speed vector of helicopter 1 relative to a reference point 47.

Screen 32 is a liquid crystal display, which may be rendered selectively opaque or transparent, depending on whether or not an electric voltage is applied to screen 32.

As a result, when an electric voltage is applied, the reflectivity of screen 32 and, therefore, the visibility of image 20 is greatly enhanced.

Screen 33 provides the pilot with a clear indication of "artificial-horizon", while ensuring that the pilot has a clear front of view.

Screens 32, 33 are foldable. Accordingly, screens 32, 33 can be easily arranged in respective stored positions, when projector group 10 is switched off and images 20, 25 are no longer required by the pilot.

Laser generator 13 is "gyro-stabilized", i.e. is maintained by motors 15a, 15b, 15c in a given constant position relative to earth.

Accordingly, the position of line 26 showing the artificial horizon is not affected by the orientation, due to roll and pitch movements, of helicopter 1, 1', 1'' relative to the earth.

Helicopter 1' is particularly advantageous, because it does not require the presence of screen 33, thus leaving more room available for crews and other equipment within cockpit 6.

Helicopter 1'' is particularly advantageous, because surface 30 is not defined by a component of helicopter 1'', but by grain sands and snow crystal outside helicopter 1''.

Accordingly, helicopter 1'' does not require dedicated equipment for surface 30.

Helicopter 1''' is particularly advantageous, because windscreen 50''' defines the whole visualization area 59, so that helicopter 1''' no longer requires dedicated equipment for surfaces 30, 31.

Clearly, changes may be made to helicopter 1, 1', 1'', 1''' and to the method as described and illustrated herein without, however, departing from the scope of protection as defined in the accompanying claims.

In particular, helicopter 1, 1', 1'', 1''' could be a convertiplane or an aircraft.

Furthermore, laser generator 13 could be replaced by a different generator adapted to generate a visible beam of radiation other than laser radiation.

The invention claimed is:

1. An aircraft (1, 1', 1'', 1''') capable of hovering, comprising:
    a fuselage (2) with a nose (5);
    a tail rotor (4) fitted to a tail fin projecting from said fuselage (2) at the opposite end of said nose (5);
    a cockpit (6) housing an instrument console (7); and
    a windscreen (50, 50', 50'', 50''') arranged in a front side of said aircraft (1, 1', 1'', 1''');
    said windscreen (50, 50', 50'', 50''') comprising an edge (55) which confines a visualization area (59) visible by an operator;
    said aircraft (1, 1', 1'', 1''') further comprising displaying means (58) capable to display at least one visual information (20, 25) associated to at least one flight parameter:
    at least in part inside said cockpit (6); and/or
    at least in part outside said cockpit (6); and/or
    at least in part on said windscreen (50, 50', 50'', 50''');
    said visual information (20, 25) being visible by said operator inside said visualization area (59), at least when said aircraft (1, 1', 1'', 1''') is in a normal flight configuration;

said visual information (20, 25) comprising at least one first image (25) associated at least to the orientation of said aircraft (1, 1', 1", 1'") relative to the earth;

characterized in that said first image (25) comprises at least one line (26) parallel, in use, to the line of horizon;

said line (26) being, in use, visible to said operator on said console (7), when said aircraft (1, 1', 1", 1'") is sloped relative to a horizontal plane with said nose (5) at a higher height than said tail rotor (4).

2. The aircraft of claim 1, characterized in that said visual information (20, 25) comprises a second image (20) associated at least to one parameter between the magnitude of speed of said aircraft (1, 1', 1", 1'"), the altitude of said aircraft (1, 1', 1", 1'") and the orientation of the speed of said aircraft (1, 1', 1", 1'").

3. The aircraft of claim 2, characterized by comprising a transparent graphic screen arranged inside said cockpit (6) and operatively connected to said displaying means (58);

said displaying means (58) being configured for displaying at least said first image (20) onto said transparent graphic screen, when said aircraft (1, 1', 1", 1'") is in said normal flight configuration.

4. The aircraft of claim 3, characterized in that said transparent graphic screen is embedded inside said windscreen (50'").

5. The aircraft of claim 1, characterized in that said displaying means (58) comprise a projector group (10) configured to project, in use, said one visual information (20, 25) onto a reflecting surface (30, 31) arranged within the size of said visualization area (59) and inside said cockpit (6), when said aircraft (1, 1', 1", 1'") is in said normal flight configuration.

6. The aircraft of claim 5, characterized in that at least one part (30) of said reflecting surface (30, 31) is defined:

by a transparent screen within which a reflective grid is embedded; or by a first reflecting screen (32) arranged in front of said windscreen (50, 50', 50", 50'"), which defines at least one first part (30) of said reflecting surface (30, 31), and which may be selectively rendered transparent or opaque, upon the application of electric voltage.

7. The aircraft of claim 6, characterized in that said transparent screen is embedded within said windscreen (50'").

8. The aircraft of claim 5, characterized by comprising a second reflecting screen (33) which defines a second part (31) of said reflecting surface (30, 31);

said second reflecting screen (33) being adapted to reflect at least a second image (25) of said visual information (20, 25).

9. The aircraft of claim 6, characterized in that at least one of said first and second reflecting screen (33) is foldable within said cockpit (6).

10. The aircraft of claim 5, characterized in that said windscreen (50', 50", 50'") defines a second part (31) of said reflecting surface (30, 31).

11. The aircraft of claim 1, characterized in that a projector group (10) comprises:

a source (13) of a radiation adapted to project a second image (25);

at least one motor (15a, 15b, 15c) controlled by said and moving said source (13) relative to said aircraft (1, 1', 1", 1'"), so as to maintain said source (13) in a given constant position relative to the earth.

12. A method for displaying a visual information (20, 25) associated to an at least one flight parameter to an operator of an aircraft (1, 1', 1", 1'") capable of hovering, comprising:

a cockpit (6)

a fuselage (2) with a nose (5);

a tail rotor (4) fitted to a tail fin projecting from said fuselage (2) at the opposite end of said nose (5); and a windscreen (50, 50', 50", 50'") arranged in a front side of said aircraft (1, 1', 1", 1'");

the method being comprising the step of displaying said at least one visual information (20, 25):

at least in part inside said cockpit (6); and/or at least in part outside said cockpit (6); and/or at least in part on said windscreen (50, 50', 50", 50'");

said step of displaying comprising the step of displaying at least one first image (25) associated at least to the orientation of said aircraft (1, 1', 1", 1'") relative to the earth;

said step of displaying comprising the step of rendering visible to an operator said visual information (20, 25) within a visualization area (59) confined by an edge (55) of said windscreen (50, 50', 50", 50'"), when said aircraft (1, 1', 1", 1'") is in a normal flight configuration;

the method being characterized by comprising the step of rendering visible at least one line (26) of said first image (25) on said console (7), when said aircraft (1, 1', 1", 1'") is sloped relative to a horizontal plane with said nose (5) at a higher height than said tail rotor (4);

said one line (26) being parallel to the line of horizon.

13. The method of claim 12, characterized in that said step of displaying comprises the step of displaying said visual information (20, 25) onto a transparent graphic screen embedded within said windscreen (50'"), when said aircraft (1, 1', 1", 1'") is in a normal flight configuration.

14. The method of claim 12, characterized in that said step of displaying said visual information (20, 25) comprises the steps of:

projecting said visual information (20, 25); and reflecting said visual information (20, 25) onto a reflecting surface (30, 31) visible by an operator and arranged above an instrument console (7) of said aircraft (1, 1', 1", 1'"), when said aircraft (1, 1', 1", 1'") is in a normal flight configuration.

15. The method of claim 14, characterized in that said step of displaying comprises the steps of displaying, when said aircraft (1, 1', 1", 1'") is in said normal flight configuration,:

said first image (25);

at least one second image (20) associated at least to one parameter between the magnitude of speed of said aircraft (1, 1', 1", 1'"), the altitude of said aircraft (1, 1', 1", 1'") and the orientation of the speed of said aircraft (1, 1', 1", 1'");

said step of reflecting comprises the step of reflecting said first image (25) onto a particulate material arranged outside said aircraft (1, 1', 1", 1'"), in particular sand or snow crystals.

\* \* \* \* \*